United States Patent [19]

Cook

[11] 3,953,828

[45] Apr. 27, 1976

[54] HIGH POWER-WIDE FREQUENCY BAND ELECTROACOUSTIC TRANSDUCER

[75] Inventor: Rufus Lee Cook, Panama City, Fla.

[73] Assignee: The United States of America as represented by the Secretary of the Navy, Washington, D.C.

[22] Filed: Nov. 8, 1968

[21] Appl. No.: 775,994

[52] U.S. Cl. .................... 340/9; 340/10; 340/8 R; 340/8 D

[51] Int. Cl.[2] .................... G01V 1/00; H04B 13/00; H04R 15/00

[58] Field of Search ............ 340/8 L, 8 S, 8 D, 8 R, 340/9, 10, 8 MM; 310/8.1, 8.3

[56] References Cited

UNITED STATES PATENTS

| | | | |
|---|---|---|---|
| 3,409,869 | 11/1968 | McCool et al. | 340/9 |
| 3,500,304 | 3/1970 | Bozich | 340/10 |
| 3,525,071 | 8/1970 | Massa, Jr. | 340/10 |

*Primary Examiner*—Malcolm F. Hubler
*Assistant Examiner*—T. M. Blum
*Attorney, Agent, or Firm*—Louis A. Miller; Don D. Doty; William T. Skeer

[57] ABSTRACT

An electroacoustical transducer assembly employs a plurality of focused piezoelectric elements. Each of said elements is made of a plurality of individual sections and energized to produce a radiation pattern having desired geometrical properties. The individual piezoelectric elements are figured to improve the frequency bandwidth and to provide for improved electrical connection thereto.

10 Claims, 13 Drawing Figures

RUFUS L. COOK
INVENTOR.

BY William T. Skeer, Agent

Dox D. Doty, Attorney

RUFUS L. COOK
INVENTOR.

BY William T. Skeer
Agent

Don J. Doty
Attorney

RUFUS L. COOK
INVENTOR.

BY William T. Spear
Agent

Dox D. Doty
Attorney

HIGH POWER-WIDE FREQUENCY BAND ELECTROACOUSTIC TRANSDUCER

The invention described herein may be manufactured and used by or for the Government of the United States of America for governmental purposes without the payment of any royalties thereon or therefor.

This invention pertains to electroacoustic transducers. More particularly, this invention relates to an electroacoustic transducer which is particularly adapted for investigating the bottom of the sea along the course of a marine vessel, either surface or subsurface, and either self propelled or towed. Sonar systems adapted for this type of investigation generally insonify a fan shaped area extending transversely across the course of the ship, and, for this reason, are called "side-looking sonars". Such applications require large insonified areas with a minimum of energy in the accompanying side lobes.

Electroacoustic transducers for use in side-looking sonars of the prior art are large, so as to handle the energy necessary to insonify the large volume required for effective operation of the system, and avoid problems of cavitation common to smaller units. The large size of the prior art transducer gives rise to complex mounting arrangements with difficult installation and service problems. An additional liability of the prior art devices is the production of large amplitude side lobes. Further, the prior art transducers are efficient over only a relatively narrow frequency range, and thereby necessitate installation of a plurality of units to cover the entire acoustic spectrum of interest in the acoustic detection and ranging arts.

With the foregoing considerations of the current state-of-the-art in mind, it is an object of this invention to provide an improved electroacoustic transducer for use with side-looking sonar systems.

It is also an object of this invention to provide an electroacoustic transducer assembly which produces a composite radiation pattern with minimum side lobes comprising two focused insonified zones.

Another object of this invention is to provide an electroacoustic transducer having a broad frequency response band.

A further object of this invention is the provision of a high efficiency focused electroacoustic transducer of compact dimensions.

Yet another object of this invention is the provision of a broad-beamed, electroacoustic transducer combined with an integrally mounted impedance matching network.

A still further object of this invention is the provision of an electroacoustic transducer employing two focused, figured, piezoelectric transducer elements.

A further object of this invention is the provision of an electroacoustic transducer having a figured piezoelectric element with a uniform coupling impedance.

Another object of this invention is the provision of an electroacoustic transducer having a radiation pattern with low amplitude side lobes generated by a plurality of focused, figured, piezoelectric elements connected in a predetermined circuit configuration.

Another object of this invention is the provision of a reversible electroacoustic transducer employing two piezoelectric elements with faces figured by two series of parallel, intersecting grooves.

Other objects and many of the attendant advantages will be readily appreciated as the subject invention becomes better understood by reference to the following detailed description, when considered in conjunction with the accompanying drawings wherein.

Figure 1:
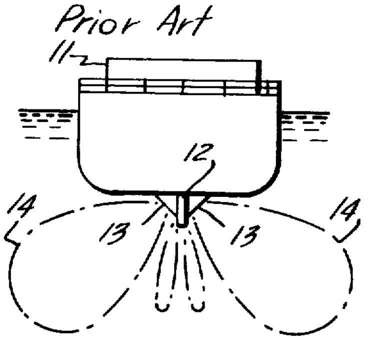
FIG. 1 is a sectional showing of a representative prior art functional arrangement of a side looking sonar.

Referring to FIG. 1, a ship 11, shown in transverse section, has a keel 12 and two planar transducers 13 mounted alongside thereof. Each of transducers 13 cooperate with suitable electronic apparatus, not shown, within ship 11 to insonified zones 14. In prior art installations, transducers 13, together with their housing and mounting structure, are bulky and require considerable effort to install and service. Too, the separate transducers of the prior art must be aligned with respect to each other, a difficult task when performed in situ.

Applicant's novel transducer assembly, herein described, is a compact, lightweight assembly of two transducers together with their coupling networks. The transducer assembly, unlike its bulky prior art counterparts, is capable of being mounted on the bottom of a ship hull, in situ, and aligned with an identical counterpart by a single diver. The assembly employs two elements which are curved such that they are prefocused and aligned with each other, so as to produce the desired radiation pattern prior to mounting. Also, compact dimensions, together with low mass of the device, permit a variety of other mounting arrangements.

Figure 2:
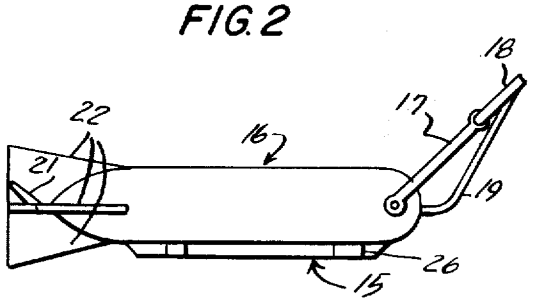
FIG. 2 is a side elevation of a towed vehicle mounting the transducer of the invention.

One alternative mounting arrangement for the invention is shown at FIG. 2. As shown, transducer assembly 15 is mounted on the lower portion of a submarine vehicle 16. A yoke 17 connects submarine vehicle 16 with a tow line 18. Electrical communication of appropriate signals for operation of transducer 15 from a surface or airborne tractor vehicle, now shown, is made via cable 19 which may be incorporated in tow line 18, if desired.

Figure 3:
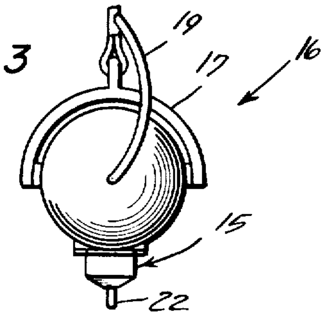
FIG. 3 is a bow view of the vehicle of FIG. 2.

Submarine vehicle 16 may be of any suitable state-of-the-art type of streamed instrumentation vehicle. Such vehicles are generally elongated cylinders (see FIGS. 2 and 3) and carry, in addition to transducer assembly 15, suitable balasting means and control mechanism to regulate the movement of submarine vehicle 16 and cause it to traverse a predetermined course. The control may be exercised through a movable control surface 21 which is a part of a stabilizing empennage 22. Conventional control arrangements keep vehicle 16 at a constant height above the bottom, or at a predetermined depth with respect to the surface. Of course, the control may be exercised by other towed vehicles and streamed gear, as will be understood by persons familiar with oceanographic instrumentation techniques. Similarly, other mounting and streaming arrangements may be used, if desired, as dictated by the particular applications in which the improved transducer will be employed.

Figure 4:
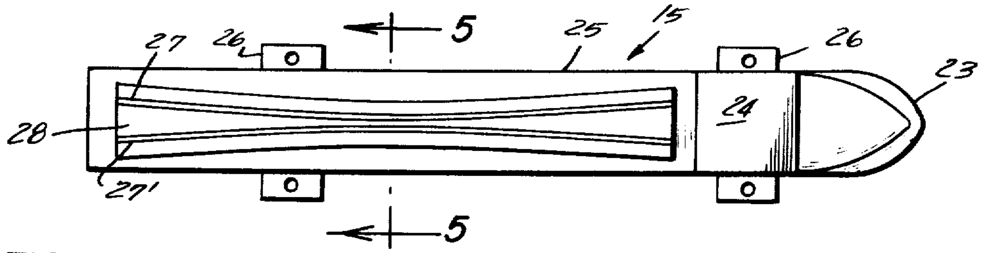
FIG. 4 is a plan view of the device of the invention.

FIG. 4 illustrates the transducer assembly 15 apart from any particular mounting configuration. It is seen that transducer assembly 15 comprises three readily identifiable sections, a forecover 23, a midsection 24, and an afterbody 25. Suitable apertured mounting flanges 26 are shown for mounting the transducer assembly 15 in a desired mounting position, but, obviously, the proficient transducer constructor may devise alternative mountings by the exercise of the ordinary skill of his calling, if desired.

Midsection 24 houses electrical driving circuit means which will be described herein. Forecover 23 encloses the external electrical connectors to the transducer assembly and serves to protect said connectors from damage due to water current and impact by water borne debris. Forecover 23 may be shaped to minimize flow resistance in accordance with the known principles of naval architecture.

Visible through the transparent surface of afterbody 25 are two curved focused piezoelectric elements 27 and 27'. As better illustrated in FIG. 5, the piezoelectric elements 27 and 27' are mounted so as to face away from each other. The angle between the two piezoelectric elements is a matter of design choice governed by the composite radiation pattern desired, as will be understood by persons versed in the art having the benefit of the teachings herein disclosed. Similarly, the amount of curvature given to each of piezoelectric elements 27 and 27' is a parameter of design determined by geometric considerations of the desired radiation pattern. In the exemplary embodiment, herein illustrated, the curve is cylindrical with the curvature exaggerated, i.e., with an unusually short radius of curvature, for purposes of clarity. Other curves, such as parabolic and hyperbolic sections, will suggest themselves for specific applications, and such curves have been successfully used in developmental studies with good effect.

Figure 5:
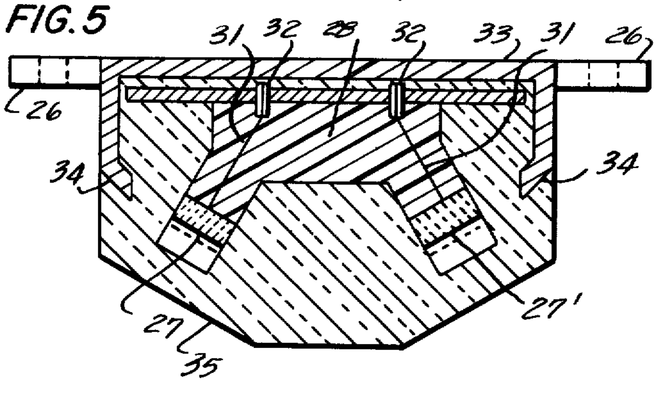
FIG. 5 is a sectional view of the device of the invention taken along line 5—5 of FIG. 4.

In FIG. 5, it may be seen that piezoelectric elements 27 and 27' are mounted on a formed mounting pedestal 28 which, in turn, is secured to a metallic mounting plate 29. Mounting pedestal 28 is made of an easily worked pressure release material, that marketed under the registered name "Corprene" has proven particularly effective. Suitable electrical conductors 31 connect piezoelectric elements 27 and 27' to the circuitry in midsection 24 via feed-through insulators 32 positioned in mounting plate 29. A channel-like backing member 33, which may extend beyond afterbody 25 to form a backing for midsection 24 provides the main structural support. Mounting flanges 26 may be formed integrally with backing member 33, or, at the option of the constructor, mechanically attached thereto. Mounting plate 29, carrying pedestal 28 and piezoelectric elements 27 and 27', is mechanically attached to backing member 33 by conventional fasteners, not shown. Backing member 33 has re-enterant edge portions 34 which aid in securing a body of acoustically transparent potting material 35 to the assemblied elements, and thereby form a unitary assembly. A variety of potting compounds may be employed in the device, but those which may be conveniently molded are preferred. In the embodiment illustrated, backing member 33 is employed as a removable part of the mold, and the resulting shape is controlled so that the surfaces are normal to the axis of propagation. Other configurations may be used with predictable results and will suggest themselves to those abreast current electroacoustic design practices for use in certain specific applications.

Piezoelectric elements 27 and 27' may be of any suitable types commonly employed in the electroacoustic transducer arts. In the exemplary embodiment disclosed herein for instructive purposes, lead zirconate has performed optimumly, although barium titanate has performed satisfactorily in developmental studies. Also, while planar stock is operative in the device of the invention, a profound improvement in frequency bandwidth is obtained when an especially figured piezoelectric stock material is employed.

Figure 6:
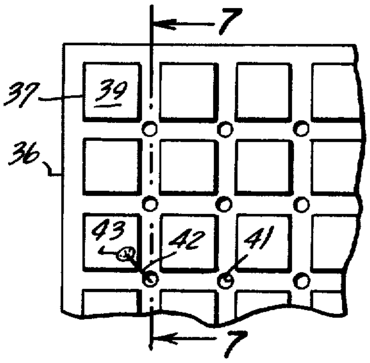
FIG. 6 is a plan view of a portion of one of the piezoelectric elements used in the device.
Figure 7:
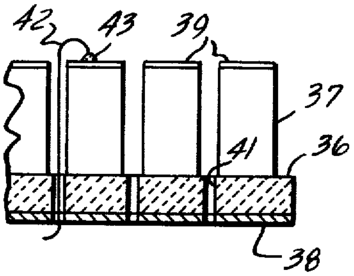
FIG. 7 is a sectional view of one of the piezoelectric elements taken along line 7—7 of FIG. 6.

FIGS. 6 and 7 illustrate the configuration of the piezoelectric stock preferred for use in the present invention. A piezoelectric sheet is figured by two series of intersecting parallel cuts so as to have a base portion 36 with perpendicularly extending posts 37. An electrode 38 extends over the outer surface of base portion 36. A second electrode 39 extends across the top of each of the posts 37. Electrodes 38 and 39 are deposited metallic layers, however other conventional electrode attachment methods may be employed, if desired.

The electrical connection to the plurality of individual electrodes 39 has, heretofore, posed a design problem for figured transducers. The obvious routing commonly used in this type configuration is to attach individual conductors to each post and route the conductors either between the posts or across the face of the posts. Mechanically, the aforedescribed wiring techniques either require relatively wide spacing between posts, or shade the output of the posts unequally. Electrically, the different electrical inter-electrode capacitances cause a difference in drive phase and magnitude which is particularly noticeable at the higher frequencies.

Applicant has solved this aforementioned problem by drilling a small diameter holes 41 through base portion 36 and electrode 38 at the intersection of the spaces between posts 37. Holes 41 permit small, hair-like conductors 42 to be threaded therethrough from the back and attached to electrode 39 with small drops of air drying solder 43. For purposes of clarity, only a single post 37 is shown connected by a conductor 42, but, as may be reaily visualized, all of the posts 37 are so connected. As a result the interelectrode capacitance is greatly reduced by this arrangement. The presence of holes 41 also has been observed to cause an increase in the bandwidth of the piezoelectric elements 27 and 27'.

Figure 8:
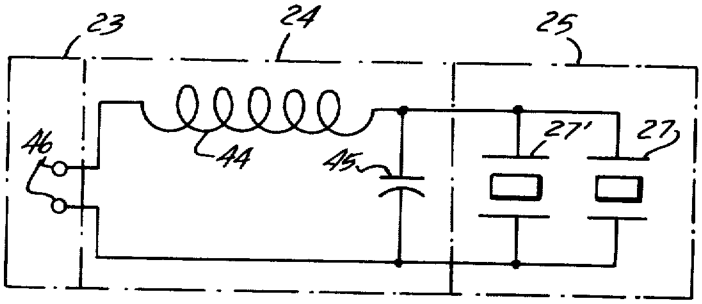
FIG. 8 is a schematic representation of the electrical circuit of the piezoelectric elements, together with their driving circuit.

Referring to FIG. 8, a drive arrangement suitable for use in the device of the invention is schematically shown. As shown, the individual piezoelectric elements 27 and 27' are connected in parallel, and, as explained supra, are in afterbody 25. Midsection 24 is shown as housing an L-pad matching network comprising an inductance 44 and a capacitor 45. Suitable terminals, indicated at 46, are incorporated in a waterproof multiprong connector which, as previously noted, is housed in forecover 23 and protected thereby. As will be understood by those versed in electroacoustics, other driving arrangements than that shown, including separate networks for each piezoelectric element, may be employed. In some instances, midsection 24 may house circuitry employing active elements, for example, receiving preamplifiers or driving amplifiers, as well as impedance matching networks made of passive elements.

Figure 9:
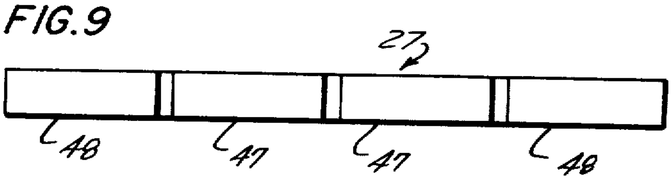
FIG. 9 is an isolated view of a piezoelectric element used in the device of the invention.

Applicant has observed that a reduction in side lobe output may be obtained by making each piezoelectric element of a plurality of separate sections of piezoelectric stock. As shown in FIG. 9, piezoelectric elements 27 and 27' are made in four sections, two center sections 47, and two end sections 48.

Figure 10:
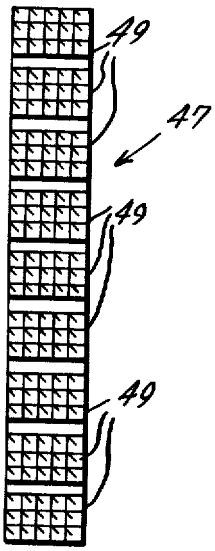
FIG. 10 is an isolated view of one section of the piezoelectric element of FIG. 9.

Each of the sections in the embodiment shown are like the others, and, as seen at FIG. 10 where a center section 47 is shown by itself, comprise nine piezoelectric units 49. Each piezoelectric unit 49 comprises an array of fifteen posts made as disclosed above and illustrated at FIGS. 6 and 7. It will be observed that each piezoelectric unit 49 is arranged in a three-by-five arrangement with the units 49 arranged as to abut along the five post sides. The piezoelectric units 49 may also be arranged to abut along their three post sides, if desired, to obtain longer piezoelectric elements which will produce a somewhat narrower beamwidth in a plane transverse and generally normal to the transducer assembly 15. Other arrangements of posts may be used for sections, and elements employing non-identical sections may be used, if desired.

Figure 11:
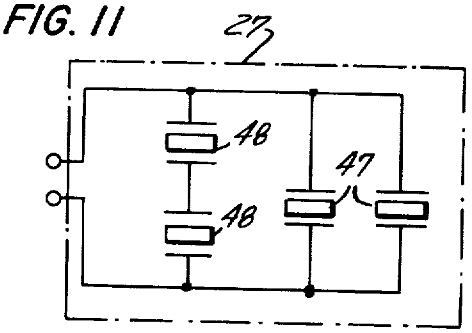
FIG. 11 is a circuit diagram showing how the individual sections of FIG. 10 are electrically joined to comprise the piezoelectric element of FIG. 9.

To reduce the side lobes of the radiation output of each of piezoelectric element 27 and 27', the individual sections are interconnected as shown at FIG. 11. End sections 48 are electrically connected in series, and the pair thus formed connected in parallel with the two center sections 47. The resulting two terminal piezoelectric network has very low side lobe radiation resulting from the difference of driving potentials applied to the individual sections and their arrangement to one another. It should be understood that additional passive electronic components, such as inductances and capacitators, may be employed in the circuit as pads to adjust the reactance of the individual sections, so as to obtain the desired ratios of driving potentials. Such adjustments have seldom been required, but when necessary are well within the scope of activities of the proficient electroacoustic worker.

Figure 12:
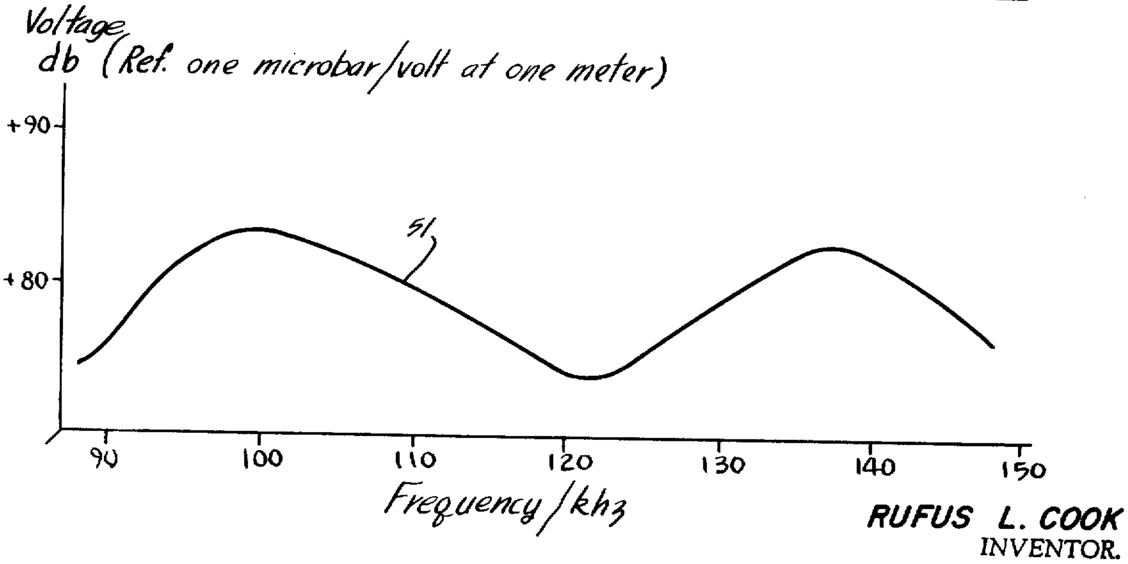
FIG. 12 is a graphic showing of the driving voltage requirements for the transducer of the invention as a function of frequency.

Reference to FIG. 12 makes apparent the broadband characteristics of the transducer of the invention. Curve 51 shows the relative driving voltage requirements for the transducer assembly 15 to be flat within ± 4 db over a 60 KHz range, a remarkable achievement in the electroacoustic transducer arts for a device of this type. Further, it is noted that there are two peaks in the curve of approximately equal magnitude, indicating two points of optimum efficiency separated by 40 KHz. Prior art arrangements characteristically have but a single point of peak efficiency.

Figure 13:
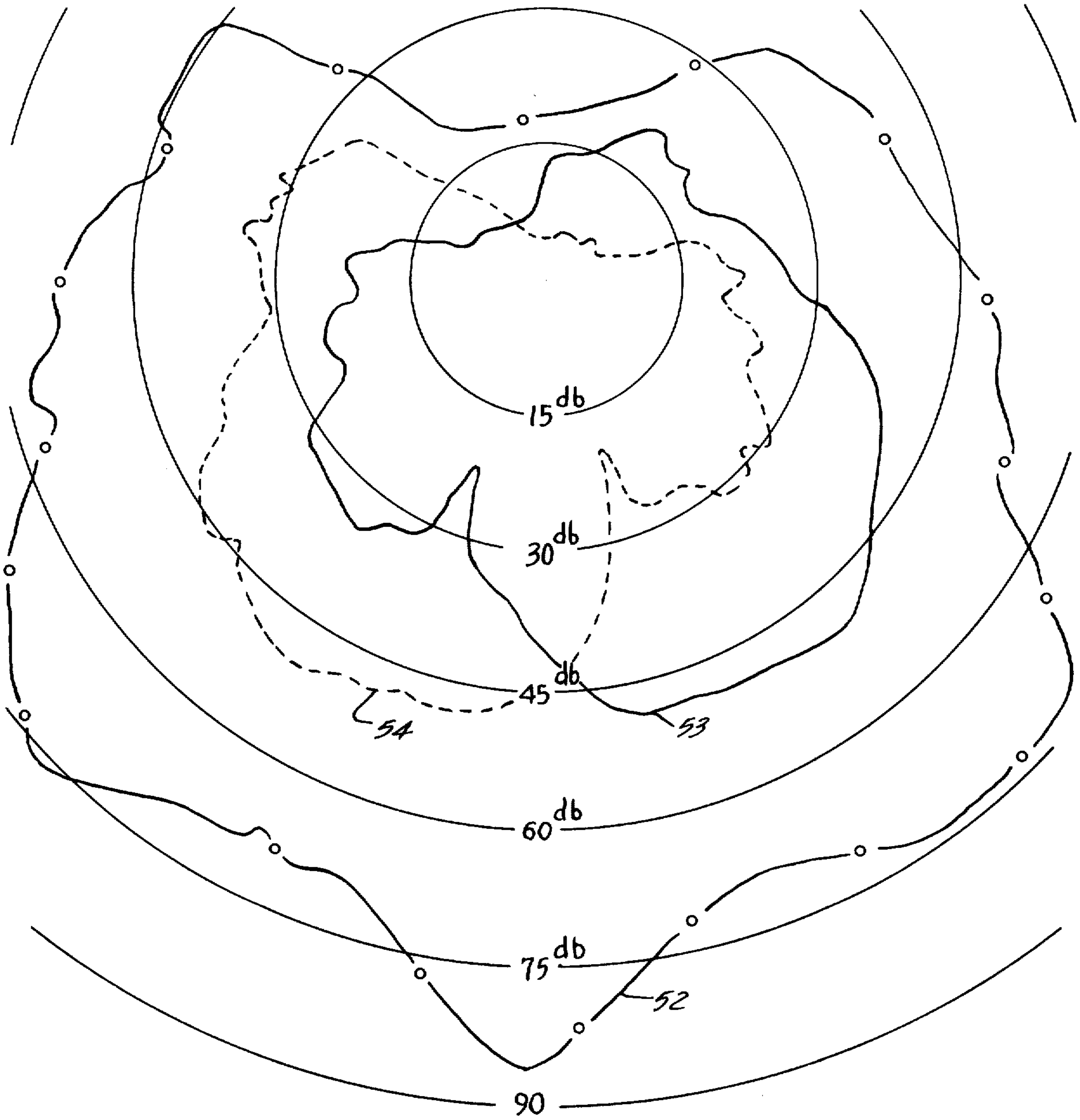
FIG. 13 is a graphic showing of the output energy of the transducer assembly and the contribution provided by the individual piezoelectric elements.

The resulting beam pattern of the transducer assembly 15 is illustrated in FIG. 13 by curve 52. As shown by curve 52, the output is a fan-shaped insonified volume having excellent symmetry to 30° on either side of the transducer axis and having only vestigal side lobes. The contribution of each of piezoelectric elements 27 and 27' to the total radiation pattern is shown by the corresponding one of curves 53 and 54, respectively. The curves illustrated are those obtained at 120 KHz at a distance from the transducer of ten meters.

Since the device may be employed with a wide variety of conventional sonar apparatus, no specific application is treated in detail herein. Accordingly, it should be understood that the device of the invention may be employed as a general purpose unit to replace conventional prior art transducers in such fields as buried object location, shrimp and oyster fishing, and navigation. The device, which is lightweight and less than 1.5m long, is capable of handling large power levels over wide frequencies without cavitation effects.

The foregoing description of an exemplary construction of this invention, taken together with the appended claims, is, therefore, seen to constitute a complete disclosure such as to enable a person skilled in the electroacoustic transducer arts to make and use the invention. Too, the aforesaid device is seen to meet the objects of the invention and to constitute a meritorious advance in the art not obvious to a skilled worker deprived of the teachings herein disclosed.

What is claimed is:

1. An electroacoustic transducer assembly comprising:

- a plurality of piezoelectric elements for converting electrical energy to acoustic energy and vice versa;
- electrical conductor means joined to said piezoelectric elements for transmitting electrical energy to and from said piezoelectric elements;
- a shaped mounting means surrounding said electrical conductor means and secured to said plurality of piezoelectric elements, forming each of said piezoelectric elements into a predetermined nonplanar configuration, spacing said piezoelectric elements to form a predetermined nonplanar spatial configuration, and made of a pressure release material, so as to effectively combine the radiation patterns of the individual elements to form a single composite radiation pattern having predetermined characteristics;
- a mounting plate secured to said shaped mounting means and lengthwise coextensive therewith, for providing torsional rigidity thereto;
- insulator means in said mounting plate and surrounding said electrical conductor means for providing a conducting path for said conductor means through said mounting plate without electrical interaction therebetween;
- electrical circuit means electrically connected to said conductor means for obtaining an optimum transfer of electrical energy between said piezoelectric elements and predetermined utilizing electrical devices; and
- housing means enclosing said plurality of piezoelectric elements together with all the aforerecited means for providing a unitary transducer assembly of compact dimensions.

2. An electroacoustic transducer assembly according to claim 1 in which said housing means includes a mass of acoustically-transparent, electrically-insulating material.

3. An electroacoustic transducer assembly according to claim 1 in which said shaped mounting means forms each of said piezoelectric elements into a cylindrical segment.

4. An electroacoustic transducer assembly according to claim 3 in which said shaped mounting means spaces said cylindrical segment piezoelectric transducer elements in such a manner that their individual axis of propagation are symmetrically divergent about a center of said shaped mounting means to thereby overlap the individual radiation patterns so as to produce a desired composite radiation pattern.

5. An electroacoustical transducer assembly according to claim 1 in which each of said piezoelectric elements is comprised of a plurality of independent piezoelectric sections for permitting selected different driving potentials to be applied to predetermined ones of said piezoelectric sections.

6. An electroacoustic transducer assembly according to claim 5 in which said piezoelectric sections are arranged mechanically in contiguous relationship and electrically in a series-parallel relationship for producing a radiation pattern with reduced side lobes.

7. An electroacoustic transducer assembly according to claim 5 in which said piezoelectric sections each comprise a plurality of separate piezoelectric units for facilitating assembly and repair.

8. An electroacoustical transducer assembly according to claim 7 in which each of said piezoelectric units comprise:

a plate of piezoelectric material;

electrode means on either side of said plate and electrically united therewith for applying electrical potentials thereto;

a series of parallel cuts extending through one of said electrode means and partially through said plate of piezoelectric material so as to thereby divide said plate into a plurality of separate areas;

a second series of parallel cuts extending through said one electrode means and partially through said plate of piezoelectric material and extending in a direction transverse to said first series of parallel cuts so as to further divide said piezoelectric plate as to delineate a series of upstanding piezoelectric posts; and apertures at the intersection of each of the cuts of said first and second series of parallel cuts extending through the remaining uncut portion of said piezoelectric plate and said remaining electrode.

9. An electroacoustical transducer assembly according to claim 8 in which said electrical conductor means comprise a plurality of small diameter wires secured to the portions of said one electrode on said piezoelectric posts and extending through said apertures for applying electrical potentials to each of said piezoelectric posts.

10. An electroacoustical transducer according to claim 9 in which said piezoelectric units are made of lead zirconate.

* * * * *